(12) United States Patent
Olschewski et al.

(10) Patent No.: US 6,837,342 B1
(45) Date of Patent: Jan. 4, 2005

(54) ACTUATOR HAVING A CENTRAL SUPPORT AND BRAKE CALLIPER COMPRISING SUCH ACTUATOR

(75) Inventors: Armin Herbert Emil August Olschewski, Schweinfurt (DE); Hendrikus Jan Kapaan, Nieuwegein (NL); Clair Druet, Drumettaz Clarafond (FR); Thomas Wilhelm Fucks, Röthlein (DE); Manfred Antensteiner, Sierning (AT); Andries Christiaan Rinsma, Utrecht (NL); Jiri Gurka, Behamberg (AT); Alexander Jan Carel De Vries, Tiel (NL)

(73) Assignee: SKF Engineering & Research Centre B.V., Nieuwegein (NL)

(*) Notice: Subject to any disclaimer, the term of this patent is extended or adjusted under 35 U.S.C. 154(b) by 0 days.

(21) Appl. No.: 10/110,836
(22) PCT Filed: Nov. 18, 1999
(86) PCT No.: PCT/NL99/00710
§ 371 (c)(1),
(2), (4) Date: Apr. 17, 2002
(87) PCT Pub. No.: WO01/36837
PCT Pub. Date: May 25, 2001

(51) Int. Cl.⁷ .......................... F16D 55/16; F16D 55/18
(52) U.S. Cl. ..................................... 188/72.8; 188/72.5
(58) Field of Search ............................. 188/72.8, 72.4, 188/72.5

(56) References Cited

U.S. PATENT DOCUMENTS

| | | | | |
|---|---|---|---|---|
| 4,374,551 A | * | 2/1983 | Birkenbach et al. | 188/71.9 |
| 4,867,280 A | * | 9/1989 | Von Gruenberg et al. | 188/72.4 |
| 4,918,921 A |   | 4/1990 | Leigh-Monstevens et al. | |
| 5,332,067 A | * | 7/1994 | Prud'homme | 188/73.1 |
| 5,348,123 A | * | 9/1994 | Takahashi et al. | 188/72.1 |
| 5,682,965 A | * | 11/1997 | Prinzler | 188/72.4 |
| 5,782,322 A | * | 7/1998 | Hauck et al. | 188/72.4 |
| 6,457,783 B1 | * | 10/2002 | Schanzenbach et al. | 303/115.2 |

FOREIGN PATENT DOCUMENTS

| | | | |
|---|---|---|---|
| DE | 196 44 441 A1 | 4/1997 | |
| DE | 197 41 867 C1 | 6/1998 | |
| DE | 198 17 892 A1 | 10/1999 | |
| GB | 2307525 A | * 5/1997 | ........... F16D/65/74 |
| WO | WO 99/27272 | 6/1999 | |

* cited by examiner

*Primary Examiner*—Robert A. Siconolfi
(74) *Attorney, Agent, or Firm*—Oliff & Berridge PLC

(57) ABSTRACT

An actuator comprises a housing (8) which contains a screw mechanism (9) and a motor (10) which is drivably connected to the screw mechanism (9), said screw mechanism providing a linear movement in response to a rotational movement of the motor, and comprising a screw (12) and a nut (13) one of which is supported rotatably with respect to the housing (8). The linearly displaceable member of the screw mechanism is drivingly connected to a pump mechanism for providing a flow of medium.

18 Claims, 8 Drawing Sheets

1

ACTUATOR HAVING A CENTRAL SUPPORT AND BRAKE CALLIPER COMPRISING SUCH ACTUATOR

The invention is related to an actuator, comprising a housing which contains a screw mechanism comprising a screw and a nut one of which is supported linearly displaceably with respect to the housing, and a motor which is drivably connected to the screw mechanism.

Such actuator is known from WO-A-9603301. Said prior art actuator is of a electromechanical type.

The object of the invention is to provide an actuator which can be driven electrically, and which has a hydraulic and/or pneumatic transmission of forces. Said object is achieved in that the housing is connected to a pump mechanism, and that the linearly displaceable member of the screw mechanism is drivingly connected to said connected to said pump mechanism, for providing a flow of medium, e.g. a liquid or a gas, at an overpressure or an underpressure.

Furthermore, the pump mechanism comprises at least one drive piston/cylinder assembly, the drive pump piston of which being set in reciprocating motion by rotation back and forth the screw mechanism, wherein the drive pump mechanism comprises a check valve.

Generally, only one driving action of the motor in one direction is necessary to displace the piston of the piston/cylinder assembly over such a distance, that sufficient oil is displaced for reaching the maximum force, e.g. the braking force in the case of pressing brake pads onto the brake disc.

After some period of service however, the stroke over which the piston is displaced increases as a result of brake pad wear. In that case, a single driving action of the motor does not deliver the required stroke of the screw mechanism and thus the maximum braking force cannot be reached.

To that end, the motor and screw mechanism are then driven a few times back and forth so as to supplement the amount of oil available in the cylinder of the piston/cylinder assembling through a check value. Subsequently, a single driving action of the motor, and thus a single stroke of the screw mechanism, suffices to reach the maximum braking force again.

Moreover, a separate fluid reservoir can be provided, connected by means of a hydraulic line to the pump mechanism for supplementing the oil after brake pad wear has taken place.

The invention is also related to a brake calliper for a disc brake, comprising a claw piece carrying at least two opposite brake pads between which a brake disc can be accommodated, and an actuator as described before displacing the brake pads towards and from each other, said actuator comprising a housing connected to the claw piece and containing one or more screw mechanisms and one or more motors which are each drivably connected to a screw mechanism, each screw mechanism providing a linear movement in response to a rotational movement of the corresponding motor, and comprising a screw and a nut one of which is supported linearly displaceably with respect to the housing.

According to the invention, the linearly displaceable member of the screw mechanism engages a pump mechanism, said pump mechanism providing a flow of medium, e.g. a liquid or a gas, at an overpressure or an underpressure, for actuating a driven piston/cylinder assembly engaging a brake pad.

The pump mechanism may comprise at least one drive piston/cylinder assembly, the drive pump piston of which being set in reciprocating motion by rotation back and forth the screw mechanism so as to compensate brake pad wear.

Also, at least one pair of drive piston/cylinder assemblies has been provided, each drive piston/cylinder assembly engaging one of two opposite driven piston/cylinder assemblies which each engage a brake pad.

Several further embodiments are conceivable as well. For instance, all or some of the components of the actuator may be obtained by means of a hard turning operation, or may be coated with a diamond-like carbon coating. In this way, wear may be reduced. Also, the actuator may be lubricated and sealed for life.

The gears applied in the gear reduction may consist of a, metallic, a non-metallic or a powder material.

The drive means can be electrical, hydraulic, pneumatic or mechanically induced by e.g. a spring.

The support shaft or tube may comprise an external flange which forms a unity therewith, or which is (laser) welded, bolted, glued, soldered etcetera thereto.

The recirculating means for the balls or rollers of the ball screw mechanism (grooves, holes or tubes) may be located in the nut or the screw.

The invention will further be explained with reference to the embodiments shown in the figures.

Figure 1:
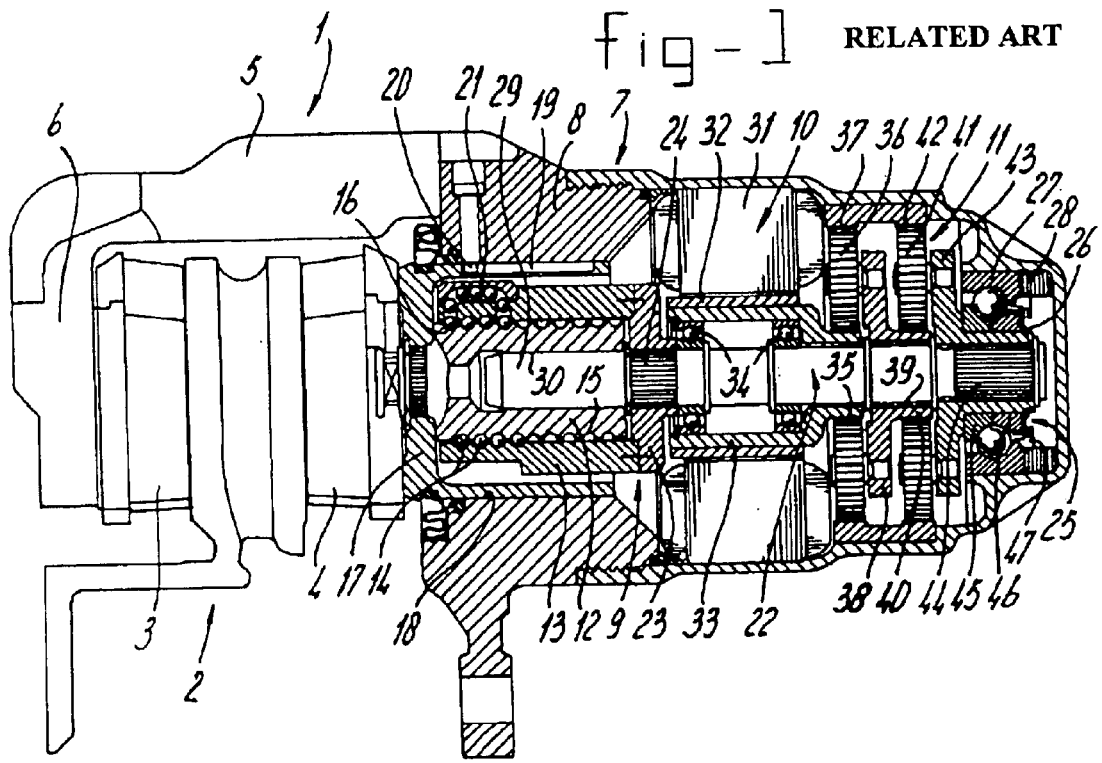
FIGS. 1-7 show several embodiments of a brake calliper comprising an actuator according to the state of the art.

FIG. 1 shows a brake calliper 1 together with a part of a brake disc 2, as described in NL-A-1009584, the brake disc 2 is enclosed between two brake pads 3, 4, which are carried in a claw piece 5 of the brake calliper 1.

Brake pad 3 is fixedly connected to flange 6 of claw piece 5; brake pad 4 engages an actuator which in its entirety is indicated by reference numeral 7.

The actuator 7 comprises a housing 8 which is connected to the claw piece 5. Within said housing 8, a screw mechanism 9 has been accommodated, as well as a motor 10 and a gear reduction 11.

The screw mechanism 9 is a so-called ball screw mechanism, comprising a screw 12 and a nut 13 which engage each other by means of balls 14 accommodated in correspondingly shaped screwthreaded grooves 15, 16.

The screw 12 is fixedly connected to a piston 17, which is accommodated within a cylinder space 18 in the housing 8. Said piston 17 is axially displaceable, as will be explained below, but non-rotatable due to the engagement between the groove 19 in the piston 17, and the pin 20 in the housing 8.

The nut 13 comprises a bypass tube 21, for recirculating the balls 15 upon rotating said nut 13. Said nut 13 is rotatable but axially non-displaceable, and is connected to the support shaft 22, in particular flange 23 thereof which engages the support shaft 22 by splines 24.

The support shaft 22 is supported with respect to the housing by means of axial support bearing 25, the inner race 26 of which is connected to said support shaft 22, and the outer ring 27 of which engages the housing 8 through load cell 28.

At its opposite end, the support shaft 22 has a supporting end 29 which protrudes into bore 30 of screw 12. Screw 12 and supporting end 29 may rotate with respect to each other. They fit together so snugly however, that the nut 12 is radially supported by said protruding end 29.

The motor 10 comprises a stator 31 connected to the housing 8, and a rotor 32 connected to a supporting bush 33 which in turn, by means of deep groove ball bearings 34, is rotatably supported with respect to support shaft 22.

Support sleeve 33 comprises a first sun gear wheel 35, engaging a first set of satellite gear wheel 36. Said satellite gear wheels 36 also engage the ring gear 37.

The satellite gear wheels 36 are rotatably supported on a carrier 38, which in turn by means of plain bearing 39 is supported with respect to support shaft 22.

The carrier 38 has a second sun gear wheel 40, which engages a second set of satellite gear wheels 41 which also engage a second ring gear wheel 42.

The satellite gear wheels 41 are rotatably supported on a second carrier 43 which is fixedly connected to the support shaft 22 by means of splines 44.

Although a two-step reduction has been shown, a one-step reduction would also be possible dependent on the displacements required and the screw lead.

The inner ring 26 of the support bearing is supported on the carrier 43. Said inner ring 26 comprises two halves 45, 46, which together with outer ring 27 constitute an a-symmetrical four-point contact ball bearing.

In particular, the load angle defined by the two opposite contact points which support the axial compressive force exerted on the shaft member 22 by the brake pads 3, 4, is smaller than the other load angle.

Furthermore, the four-point contact ball bearing 25 comprises integrated sensor means 47 for measuring rotation, etcetera.

By controlling electric motor 10, a rotation of support shaft 22 is generated through the gear reduction 11. In turn, the screw 12 is rotated, as a result of which the nut 13 together with piston 17 is displaced in axial direction. Thereby, the brake pad 3, 4 are moved towards each other or away from each other, so as to cause the desired braking effect.

Figure 2:
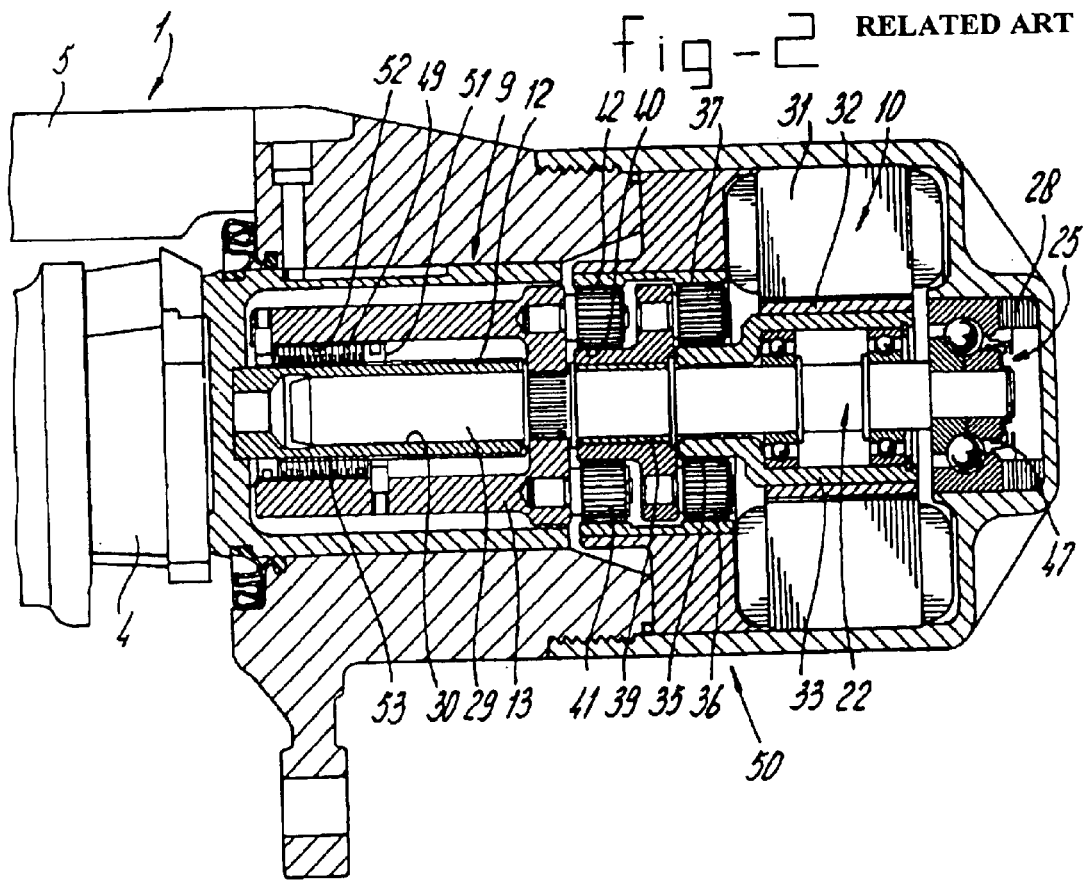

The brake calliper shown in FIG. 2 corresponds to a large extend to the one as shown in FIG. 1. However, the screw mechanism 9 now comprises rollers 49 which are contained in a cage 51. The rollers 49 engage screwthreads 52, 53 in respectively the rotating but axially non-displaceable nut 13, and in the non-rotatable but axial displaceable screw 12.

Moreover, the reduction 50 has now been situated between the motor 10 and the screw mechanism 9. The reduction 50 itself is essentially symmetrical with respect to the reduction 11 shown in FIG. 1.

Also, the support shaft 22 is almost identical to support shaft of FIG. 1.

Figure 3:
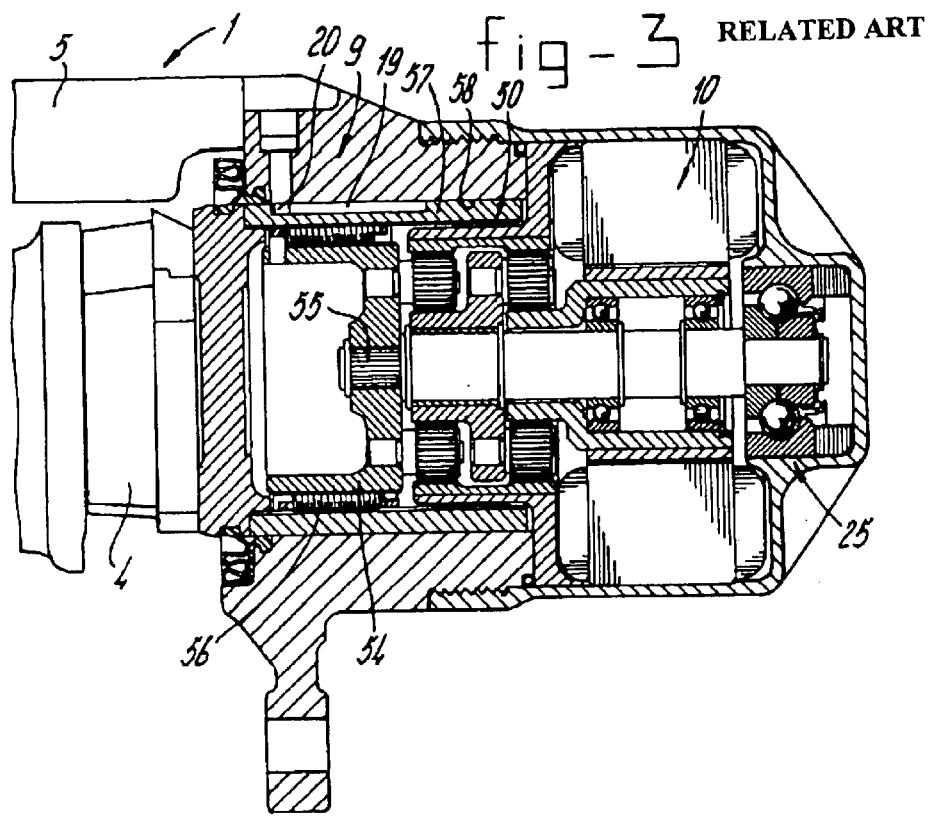

FIG. 3 shows an embodiment wherein the support shaft 22 is fixedly connected to screw 54 by means of splines 55. Through rollers 56, said screw 55 engages a nut 57 which is piston-shaped. Said nut is axially displaceable within cylinder space 58 in housing 9, but is held non-rotatably as a result of the engagement of its groove 19 with pin 20.

The reduction gear 50 can be identical to the reduction gear 50 in the embodiment of FIG. 2. By controlling the motor 10, the nut 57 is moved in axial direction for controlling the mutual distance of brake pads 3, 4.

Figure 4:
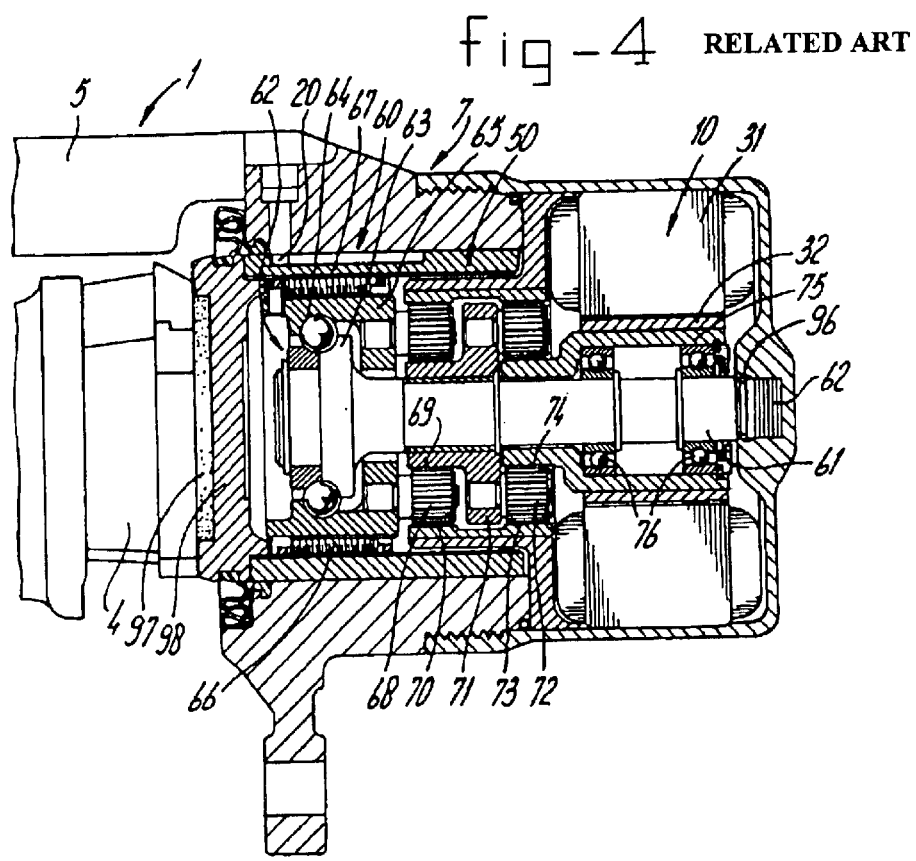

The embodiment of FIG. 4 shows a brake calliper having a motor 10, a reduction gear 50 which can be identical to the reduction of FIGS. 2 and 3, and a screw mechanism 60.

According to the invention, the support shaft 61 is fixed, both in axial and rotational direction, with respect to the housing 7. The end of support shaft 61 connected to the housing 7 is supported by a load cell 62, for measuring the axial force exerted on said support shaft 61. Said shaft 61 is locked axially in the housing 9 by means of lock ring 96, accommodated in grooves.

At its other end, the support shaft 61 protrudes into the screw mechanism 60. In particular, said end carries a partly or fully integrated four-point contact angle support bearing 62. The inner ring 63 of said support bearing 62 forms a unity with the support shaft 61; the outer ring 64 thereof is integrated in the screw 65 of screw mechanism 60.

Said screw mechanism 60 furthermore may comprise rollers 66 or balls and nut 67, which by means of groove 19 and pin 20 is axially displaceable, but non-rotatable.

The nut 67 is closed by means of a head 98, which may also form a unity with nut 67 (piston). The head 98 carries a heat-insulating ceramic disc 97.

The screw 65 carries a first set of satellite gear wheels 68, which engage a first sun gear wheel 69 as well as a first ring gear 70 connected to the housing 7. The sun gear wheel 69 is accommodated on a carrier 71, which carries the second pair of satellite gear wheels 72. Said satellite gear wheels 72 engage a second ring gear 73, as well as a second sun gear wheel 74.

Said sun gear wheel 74 is connected to a support sleeve 75, which by means of bearings 76 is rotatably supported with respect to support shaft 71.

By controlling the motor 10, the screw 65 is rotated through reduction 50. As a result, the nut 67 is moved in axial direction, thus changing the mutual spacing of brake pads 3, 4. Also, the support bearing for the motor can be equipped with sensors.

Any axial forces resulting from the contact between the brake pads 3, 4 and the brake disc 2 are carried by the four-point contact angle support bearing 62, which via support shaft 61 transfers the axial forces to the housing 7.

Figure 5:
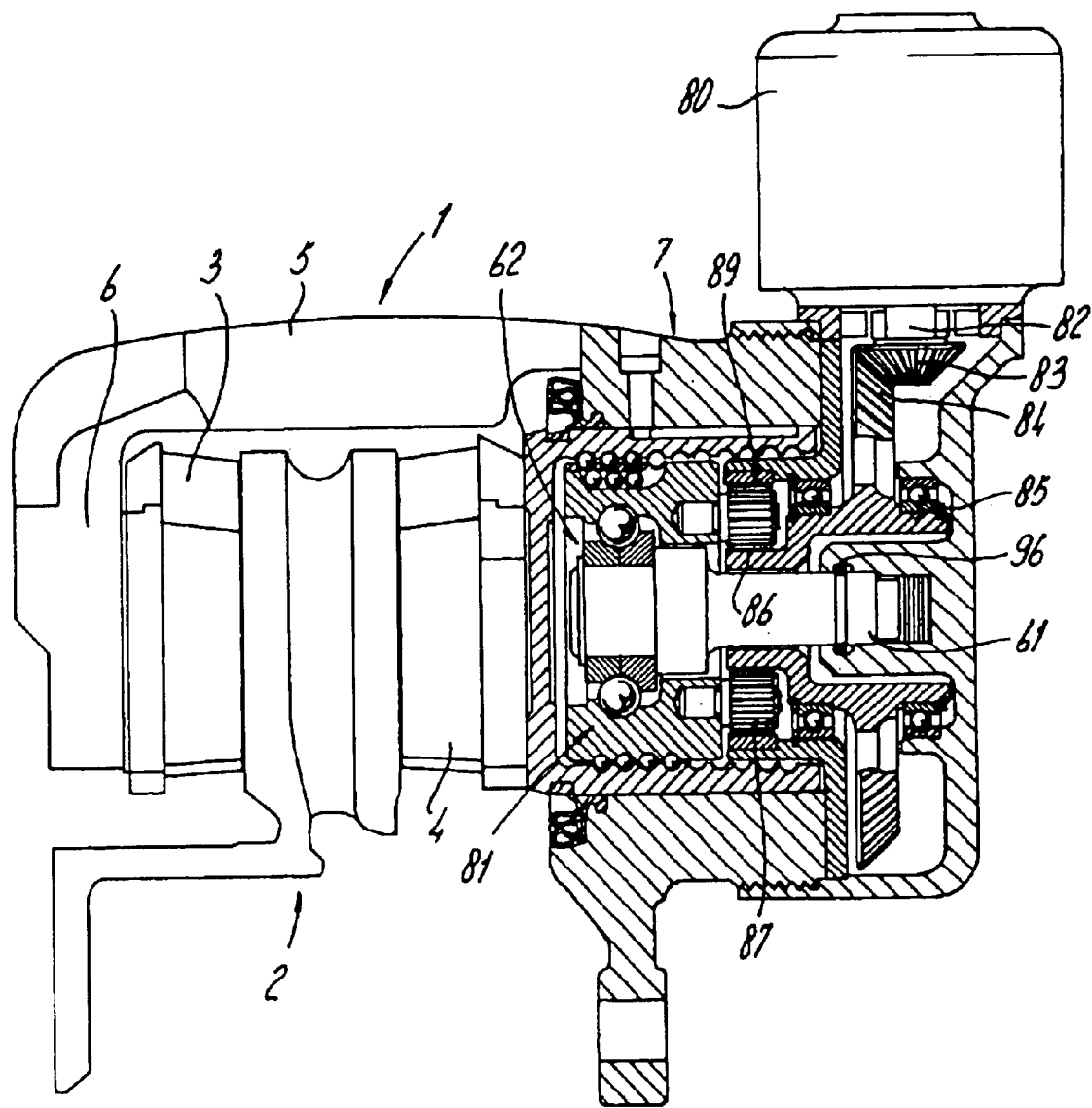

The embodiment of FIG. 5 has a motor 80 which is right-angled with respect to screw mechanism 81. Shaft 82 of motor 80 is connected to a bevel pinion 83, which in turn engages a bevel gear 84. By means of bearings 85, the bevel gear 85 is rotatably supported with respect to the housing 7.

The bevel gear 85 forms a unity with sun gear 86, which in turn via satellite gear wheels 87 and ring gear 89, drives screw mechanism 81.

Figure 6:
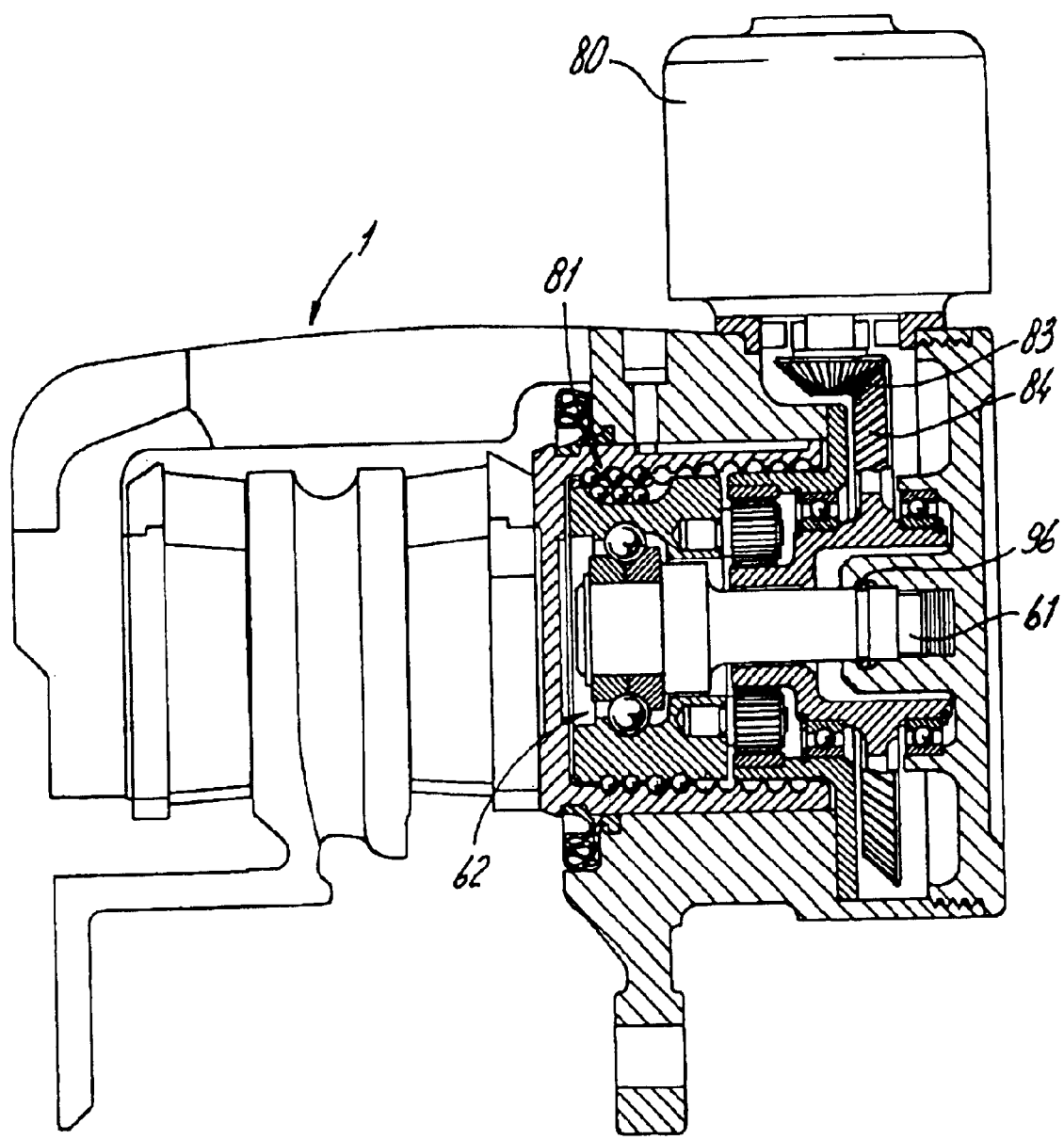

In the embodiment of FIG. 6, the bevel pinion 83 is between the bevel gear 84 and the screw mechanism 81, as a result of which a more compact brake calliper is obtained.

As indicated by the dotted lines, the four-point contact angle support bearings 62 have a-symmetrical load angles for an improved axial compressive load bearing capacity.

Figure 7:
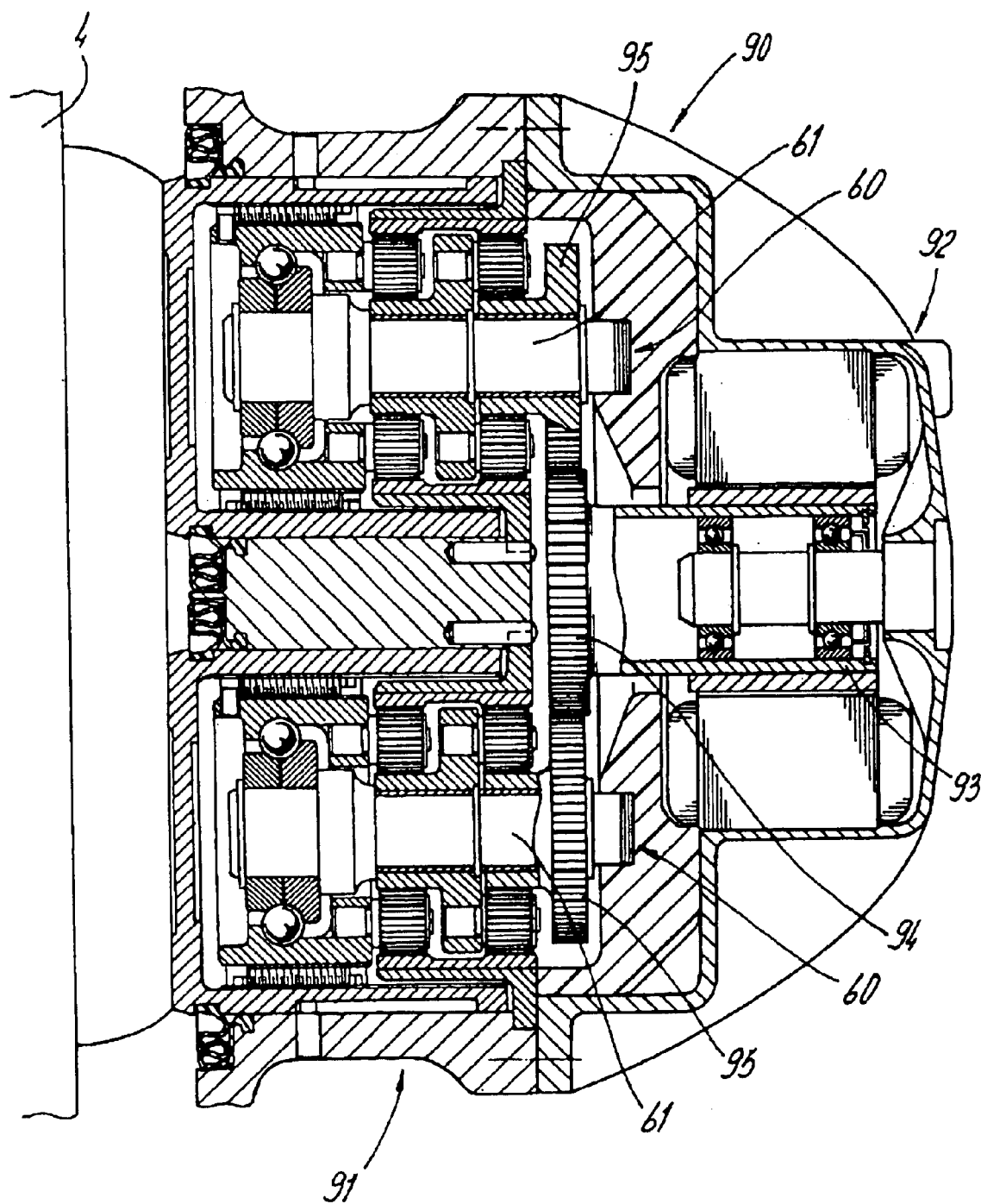

The embodiment of FIG. 7 according to the invention shows a detail with part of a brake pad 4, actuated by means of two actuators 90, 91, which are both driven via a single motor 92. Said motor 92 engages a sleeve 93 having a sun wheel 94, which by means of drive gear wheels 95 drives both screw mechanisms 90, 91. Alternatively, both actuators may be provided with an own motor having each a gear reduction or one reduction near the motor.

In FIGS. 1-7 the housings are fixed by threading onto the calliper. However, fixation by bolting is also possible.

Figure 8:
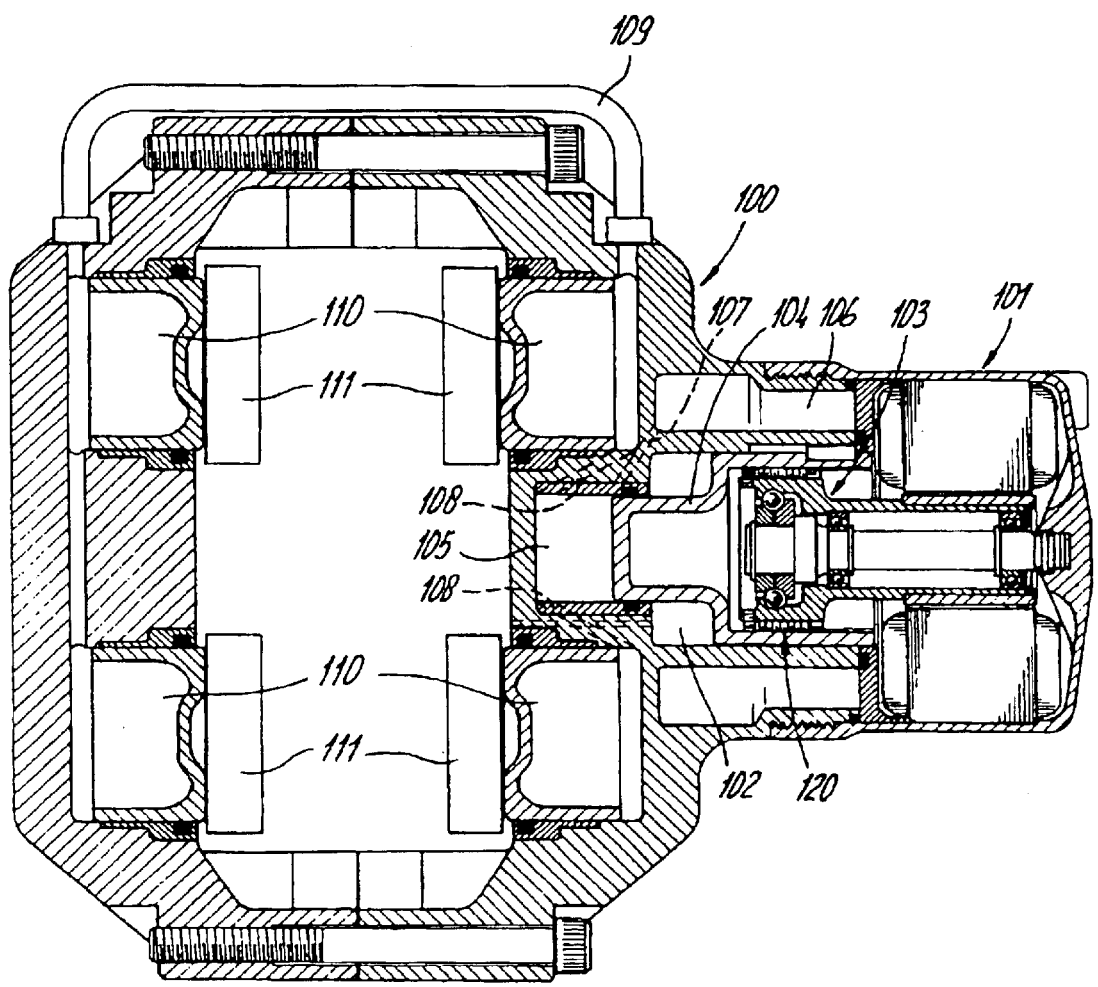
FIGS. 8-11 show several mechanical/hydraulic embodiments according to the invention.

The embodiment of FIG. 8 according to the invention comprises a brake calliper 100, the actuator 101 of which is integrated with a pump mechanism 120. In particular, the piston-shaped nut 102 the screw mechanism 103 of the actuator 101 is integrated with a hydraulic piston 104, contained in a cylinder 105.

Moreover, a fluid reservoir 106 is integrated in the actuator 101. Via channels 107, fluid can be fed from the reservoir 106 into the cylinder space 105.

From the cylinder space 105, the fluid is fed, by means of channels 108, 109, to the driven piston/cylinder devices 110 which each actuate a brake pad 111.

Figure 9:
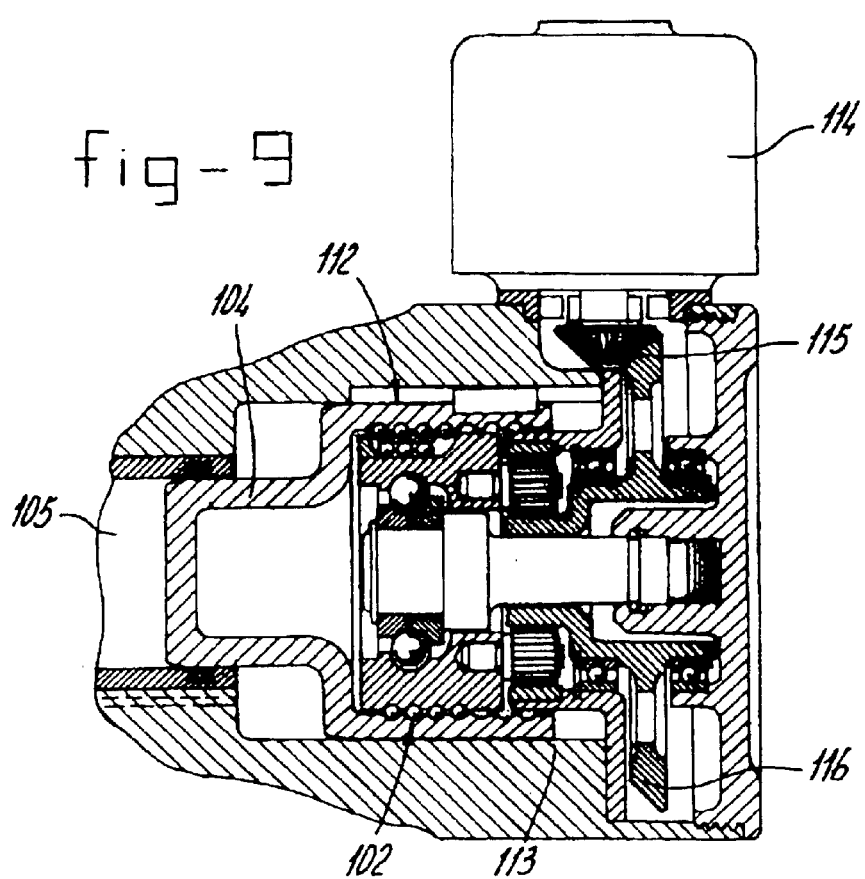

FIG. 9 shows an alternative embodiment, wherein the nut 102 is an integral part of a ball screw mechanism 112, which is driven by means of a reduction gear mechanism 113. The motor 114 is right angled with respect to the screw mechanism 112, and drive said screw mechanism by means of bevel gears 115, 116.

Figure 10:
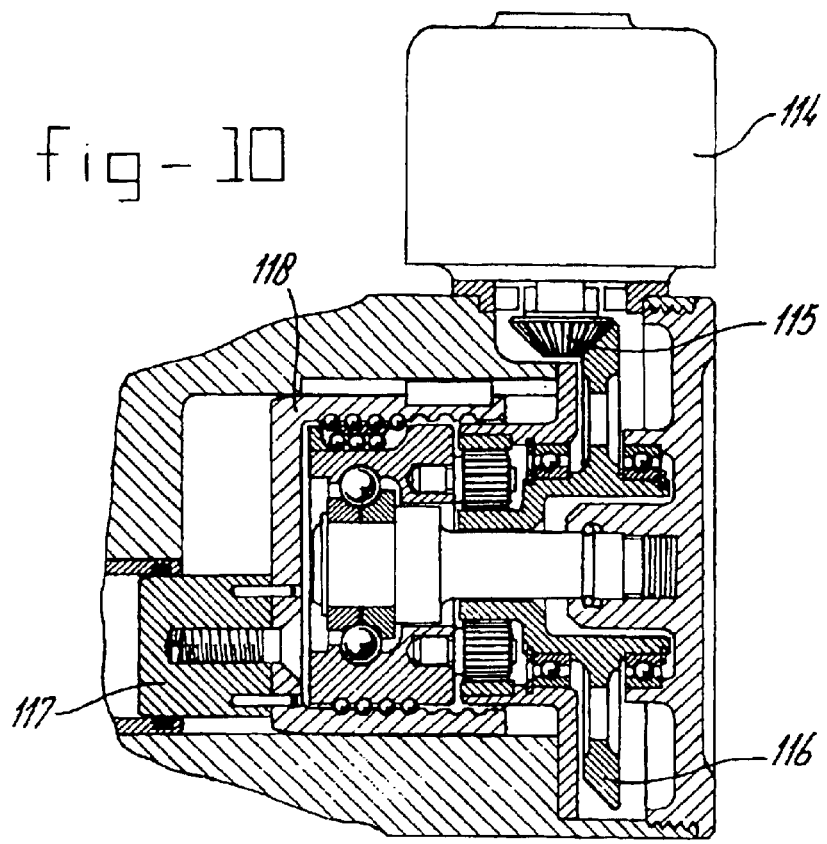
Figure 11:
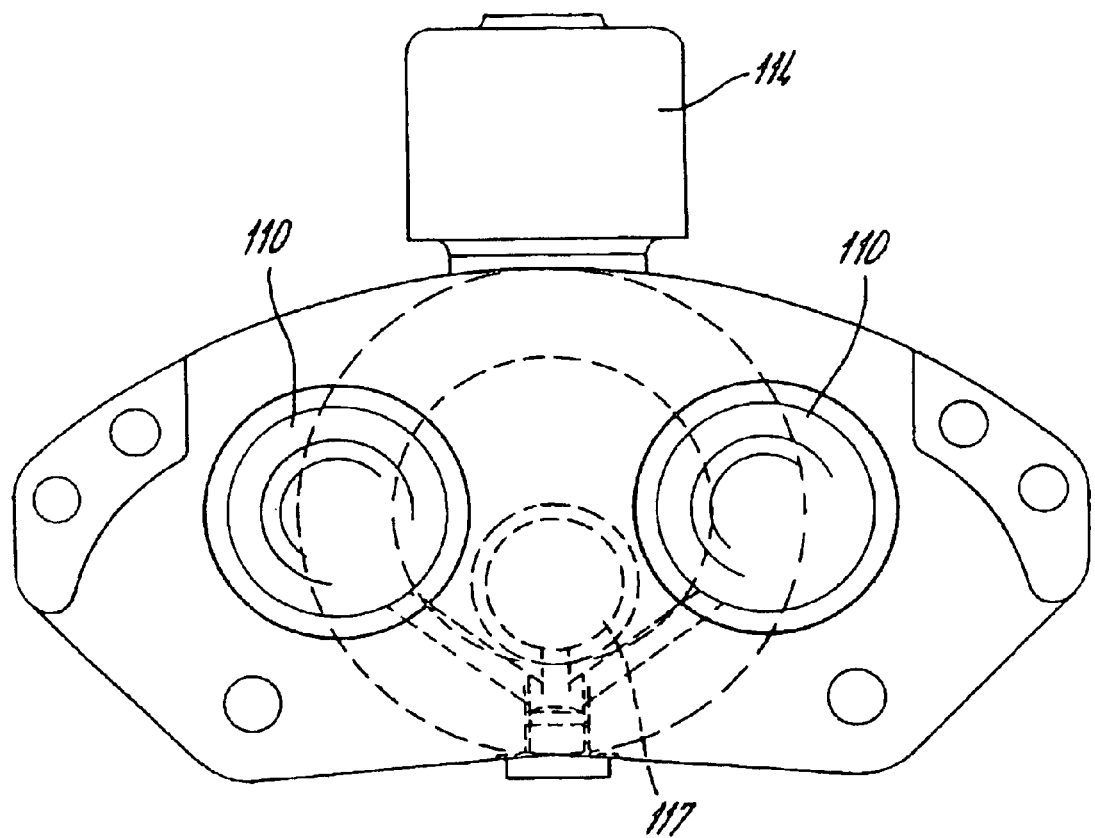

The embodiment of FIGS. 10 and 11 resembles the embodiment of FIG. 9 to a large extent. However, the hydraulic piston 117 is now mounted excentric with respect to the piston 118.

As shown in FIG. 11, this embodiment has the advantage of a more compact construction. The hydraulic piston 117 is excentric with respect to the driven piston cylinder devices 110.

What is claimed is:

1. A method for driving an actuator, comprising a housing which contains a screw mechanism comprising a screw and a nut one of which is supported with respect to the housing and a motor which is drivably connected to the screw mechanism, the housing being connected to a pump mechanism, and the linearly displaceable member of the screw mechanism being drivingly connected to said pump mechanism for providing a flow of medium, the method comprising the step of driving back and forth the screw mechanism in at least two cycles which directly succeed each other for delivering the required stroke of the screw mechanism.

2. A method for driving a brake calliper for a disc brake, comprising a claw piece carrying at least two opposite brake pads between which a brake disc can be accommodated, and an actuator for displacing the brake pads towards and from each other, said actuator comprising a housing connected to the claw piece and containing one or more screw mechanisms and one or more motors drivably connected to the screw mechanisms, said screw mechanisms providing a linear movement in response to a rotational movement of the motor, and comprising a screw and a nut one of which is supported linearly displaceably with respect to the housing, the linearly displaceable member of the screw mechanism engaging a pump mechanism, said pump mechanism providing a flow of medium, the method comprising the steps of:

detecting an actual distance over which the piston is driven before reaching a reference point indicative of a braking action, comparing said actual distance with a preset maximum allowable distance, driving back and forth the screw mechanism in at least two cycles which directly succeed each other for compensating brake pad wear in case the actual distance exceeds the maximum allowable distance.

3. The actuator according to claim 2, wherein the drive pump mechanism comprises a check valve.

4. The actuator according to claim 2, wherein a separate fluid reservoir is provided, connected by means of line to the pump mechanism.

5. A brake calliper for a disc brake, comprising a claw piece carrying at least two opposite brake pads between which a brake disc can be accomodated; an actuator for displacing the brake pads towards and from each other, said actuator comprising a housing connected to the claw piece and containing one or more screw mechanisms and one or more motors which are drivably connected to the one or more screw mechanisms, at least one of said screw mechanisms capable of providing a linear movement in response to a rotational movement of the motor, and comprising a screw and a nut one of which is supported linearly displaceably with respect to the housing, the linearly displaceable member of the screw mechanism capable of engaging a pump mechanism, said pump mechanism providing a flow of medium, and a controller for controlling said actuator to drive said screw mechanism back and forth in at least two cycles.

6. The brake calliper according to claim 5, wherein the pump mechanism comprises at least one drive piston/cylinder assembly, the drive piston/cylinder assembly comprising a drive pump piston capable of being set in reciprocating motion by the movement back and forth of the screw mechanism.

7. The brake calliper according to claim 5, wherein at least one pair of drive piston/cylinder assembly is provided, each capable of engaging one of two opposite driven piston/cylinder assemblies which each engage a brake pad.

8. The brake calliper according to claim 6, wherein at least one piston/cylinder is offset with respect to the screw mechanism.

9. The brake calliper according to claim 5, wherein a fluid reservoir is integrated in the calliper.

10. The brake calliper according to claim 5, wherein a separate fluid reservoir is provided, connected by means of line to the pump mechanism.

11. The brake calliper according to claim 5 wherein the drive pump mechanism comprises a check valve.

12. The brake calliper according to claim 5, wherein a load cell or sensor is provided, as well as a control device for controlling the motor on the basis of signals from the load cell sensor.

13. The brake calliper according to claim 5, wherein the motor is an electric, hydraulic or pneumatic motor.

14. The brake calliper according to claim 5, wherein at least one of the components of the actuator is at least partly coated with a carbon coating.

15. The brake calliper according to claim 5, wherein at least one of the components is obtained by means of a hard-turning operation.

16. The brake calliper according to claim 5, further comprising a support shaft protruding into the screw mechanism; and an angular contact ball bearing, wherein the ball bearing is engaged with the support shaft.

17. The brake calliper according to claim 5, wherein a heat insulating pad is arranged on a piston head.

18. A method for driving the brake calliper according to claim 5, comprising the steps of:

detecting an actual distance over which the piston is driven before reaching a reference point indicative of a braking action, comparing said actual distance with a preset maximum allowable distance, driving back and forth the screw mechanism in at least two cycles which directly succeed each other for compensating brake pad wear in case the actual distance exceeds the maximum allowable distance.

* * * * *